United States Patent
Kitada

(10) Patent No.: US 7,167,558 B2
(45) Date of Patent: Jan. 23, 2007

(54) FOLDABLE PORTABLE TELEPHONE

(75) Inventor: Yoshitsugu Kitada, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 10/734,061

(22) Filed: Dec. 11, 2003

(65) Prior Publication Data

US 2004/0120514 A1 Jun. 24, 2004

(30) Foreign Application Priority Data

Dec. 11, 2002 (JP) ............................. 2002-359283

(51) Int. Cl.
*H04M 1/03* (2006.01)
(52) U.S. Cl. .................... 379/433.04; 379/433.06; 379/433.13; 455/575.3
(58) Field of Classification Search ......... 379/433.13, 379/433.04, 433.06, 433.07, 433.12; 455/567, 455/575.1, 575.3, 90.3, 575.4
See application file for complete search history.

(56) References Cited

U.S. PATENT DOCUMENTS

| | | | | |
|---|---|---|---|---|
| 6,501,967 | B1 * | 12/2002 | Makela et al. | ............... 455/567 |
| 6,928,307 | B2 * | 8/2005 | Ohtsuki | ....................... 455/567 |
| 6,944,481 | B2 * | 9/2005 | Hama et al. | ................. 455/566 |
| 2002/0146989 | A1 | 10/2002 | Moriki | |
| 2004/0087353 | A1 * | 5/2004 | Satoh et al. | ............. 455/575.3 |

FOREIGN PATENT DOCUMENTS

| | | |
|---|---|---|
| EP | 1 244 275 A1 | 9/2002 |
| GB | 2 358 318 A | 7/2001 |
| GB | 2 358 758 A | 8/2001 |
| JP | 10-215303 | 8/1998 |
| JP | 11-068899 | 3/1999 |
| JP | 2001-136247 | 5/2001 |
| JP | 2002-141993 | 5/2002 |
| JP | 2002-204298 | 7/2002 |

* cited by examiner

*Primary Examiner*—Harry S. Hong
(74) *Attorney, Agent, or Firm*—Scully, Scott, Murphy & Presser, P.C.

(57) ABSTRACT

A piece of data to be sent by mail is selected from data displayed on the back surface liquid crystal in the state of the portable telephone being folded. The selected data is sent with a button operating. Upon completion of the mail sending, the mail sending ends with a button operation. Similarly, mail is received in the same manner in the state of the portable telephone being folded.

17 Claims, 6 Drawing Sheets

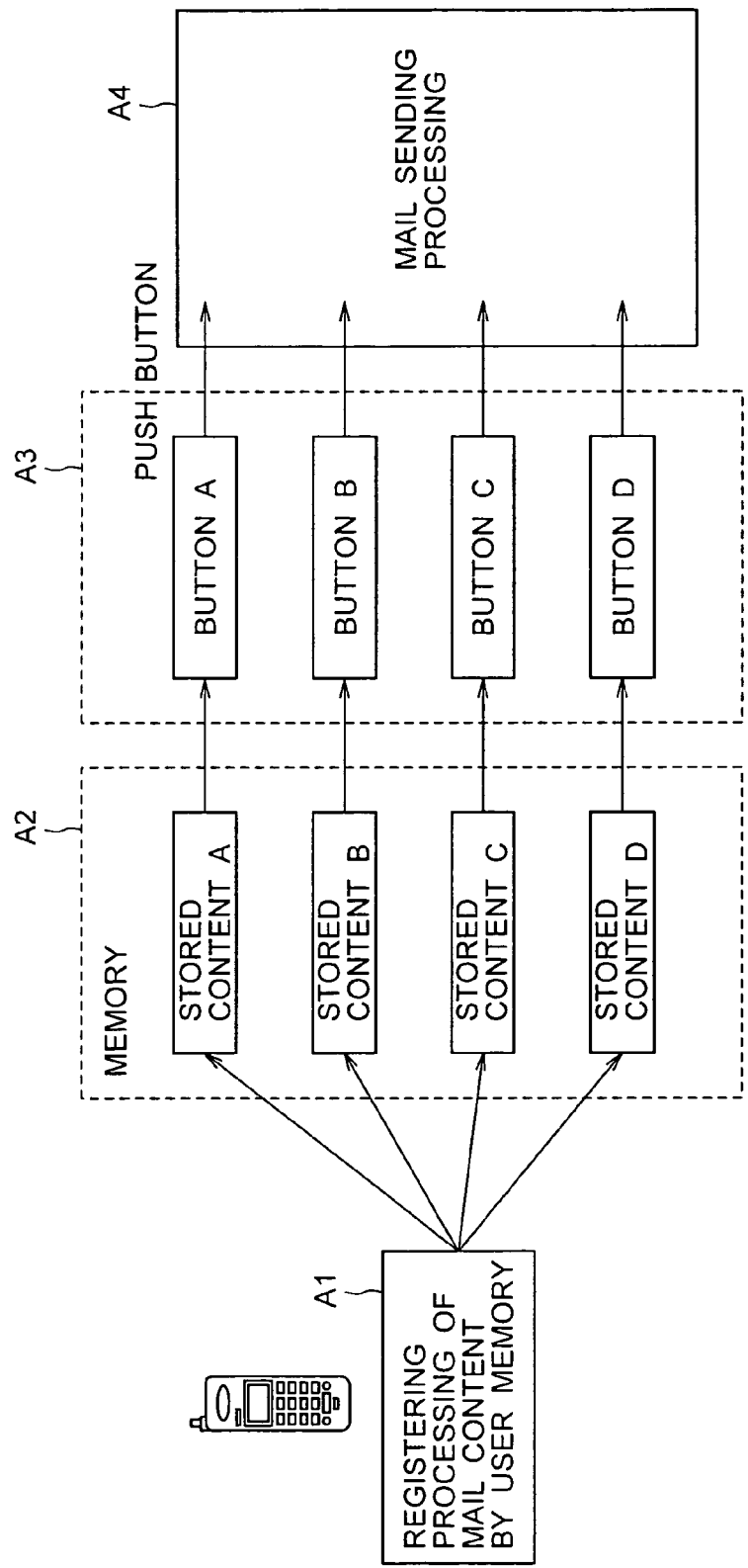

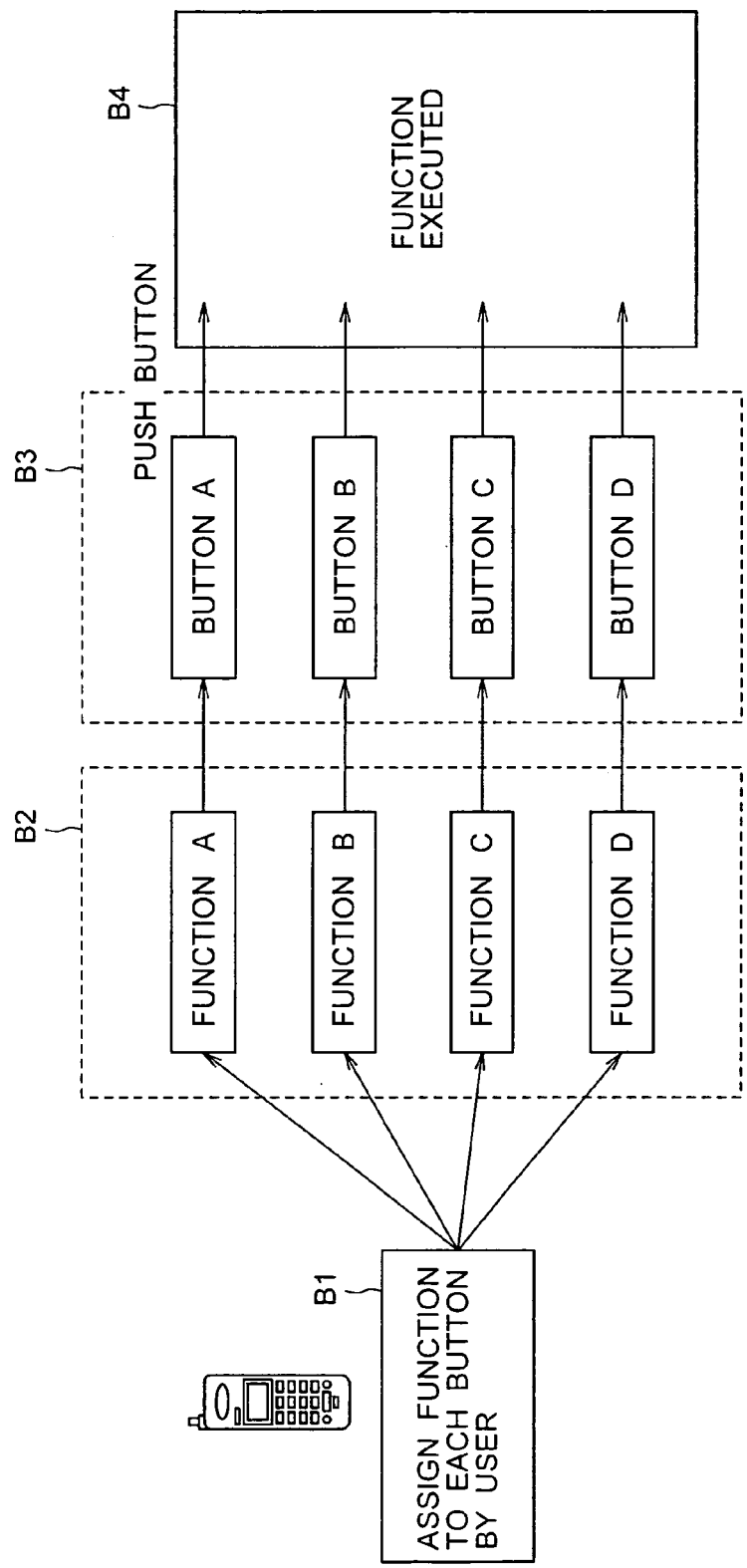

FOLDABLE PORTABLE TELEPHONE

BACKGROUND OF THE INVENTION

1. Field of the Invention

The present invention relates to a foldable portable telephone, and in particular, to a foldable portable telephone which is to be so folded that the main operation unit and the main display come to the inner side.

2. Description of the Related Art

As functions of portable telephones have increased, a foldable type comes to the main stream in order to cope with demands to increase displaying volume of the displays. When operated for phone calls or mail, a foldable portable telephone is operated after it is opened. In order to solve such an inconvenience that a user operates the portable telephone after opening it, there is disclosed a structure in which a second display is arranged at a position where information can be checked without opening the portable telephone (for example, see the Japanese Patent Application Laid-open No. 2002-141993).

However, in the conventional foldable portable telephone described above, there is a problem that when operated for calls or mail, it must be operated after opened, which is inconvenient for a user.

With the structure disclosed in the aforementioned Japanese Patent Application Laid-open No. 2002-141993, although it is not necessary to open the portable telephone to check received mail, there still remains a problem that it must be opened for sending mail.

It is therefore an object of the present invention to provide a foldable portable telephone with high convenience, which is capable of achieving a mail sending function and the like without open-close operations.

A foldable portable telephone according to the present invention comprises: a body of the portable telephone which is foldably formed; a main operation unit for causing a function of the body of the portable telephone to be executed; a main display for displaying electronic data retained in the portable telephone; a sub-display arranged at a viewable position in the folded state; and a communication controlling means arranged at an operable position in the folded state. The main operation unit and the main display are arranged at positions on the inner sides of the body of the portable telephone when folded, and the sub-display displays the electronic data retained in the portable telephone. The communication controlling means is to be operated in the state that the body of the portable telephone is folded, and performs controlling for displaying on the sub-display the electronic data retained in the portable telephone and controlling of communications of the electronic data to be displayed on the sub-display.

In the present invention, the communication control unit is operated, electronic data retained in the body of the portable telephone is displayed, and among the electronic data, a piece of electronic data to be controlled for communications is selected, in the state that the body of the portable telephone is folded. After the electronic data is selected, the communication control unit is operated again to control communications of the selected electronic data.

Therefore, electronic data retained in the portable telephone can be sent or taken into the portable telephone while the body of the portable telephone is folded. In a case that the electronic data is an e-mail message which has been stored and retained in the portable telephone, the message can be sent while the portable telephone is folded.

The electronic data may be Internet data registered and retained in the portable telephone, or Web site data obtained through connecting to a Web site by using the Internet data and stored in the portable telephone. With the electronic data, it is possible to upload or download data, in the state that the body of the portable telephone is folded, with the use of the Internet.

In the present invention, it is preferable that the communication controlling means be configured to include a plurality of operation buttons.

With this configuration, by assigning functions of the communication control means to a plurality of operation buttons, and selectively operating these operation buttons, it is possible to cause the functions of the communication control means to be executed effectively.

It is preferable that a plurality of operation buttons be arranged around the sub-display.

With this configuration, the operation buttons can be operated while being checked through a display of the sub-display.

In the present invention, it is also preferable that a plurality of operation buttons be arranged around the sub-display and on a side surface of the body of the portable telephone.

With this configuration, arrangements of the operation buttons can be set considering the functions assigned to respective operation buttons.

Further, in the present invention, shapes of the operation buttons may differ according to the functions thereof.

With this configuration, although a plurality of operation buttons are provided, the functions necessary for communication controls can be differentiated based on the shapes of the buttons.

In the present invention, the operation buttons may be assigned a function of selecting electronic mail data as well as a function other than the function of selecting electronic mail data. In this case, the operation buttons may be assigned a function of playing a ring tone in addition to the function of selecting electronic mail data. Further, the operation buttons may be assigned a function of displaying a schedule on the sub-display in addition to the function of selecting electronic data. The operation buttons may also be assigned a function of displaying on the sub-display a piece of electronic mail data selected from plural pieces of electronic mail data. The operation buttons may also be assigned a function of registering electronic mail data. Further, the operation buttons may be assigned the function of selecting electronic mail data or a function of sending electronic mail data as well as a function other than the function of selecting a mail message and the function of sending electronic mail data. Further, the operation buttons may be assigned the function of playing a ring tone in addition to the function of selecting electronic mail data or the function of sending electronic mail data. Further, the operation buttons may be assigned the function of displaying a schedule to the sub-display in addition to the function of selecting electronic mail data or the function of sending electronic mail data.

BRIEF DESCRIPTION OF THE DRAWINGS

FIG. 3 is a diagram showing an operational flow of a first embodiment according to the present invention;

FIG. 5 is a diagram showing an operational flow of a second embodiment according to the present invention.

PREFERRED EMBODIMENTS OF THE INVENTION

Embodiments of the present invention will be explained below with reference to the drawings.

Figure 1:
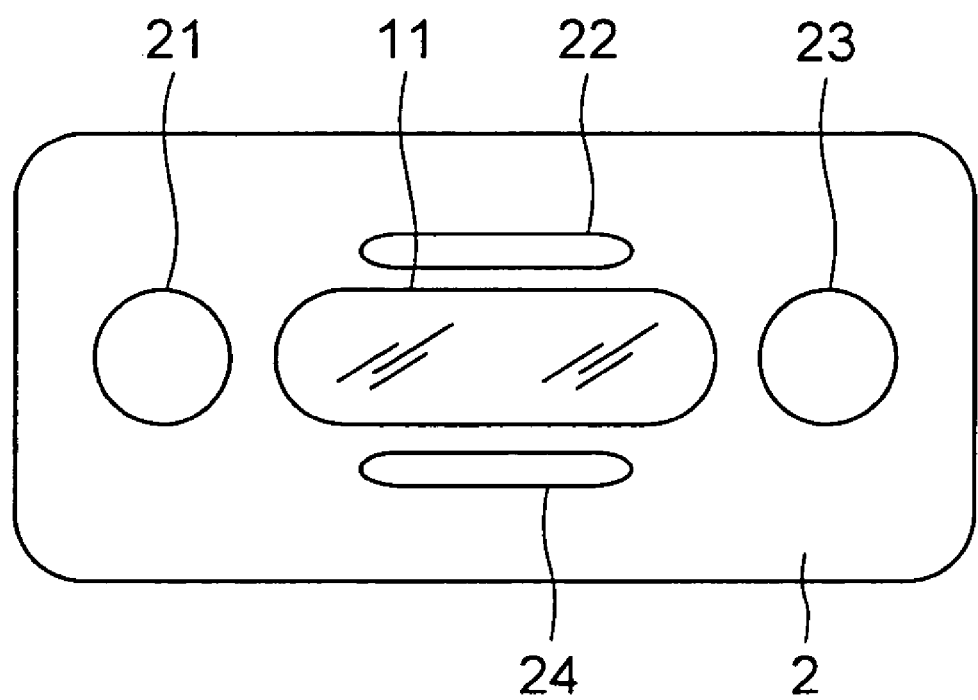
FIG. 1 is a diagram showing the back surface of a foldable portable telephone according to the present invention.
Figure 2A:
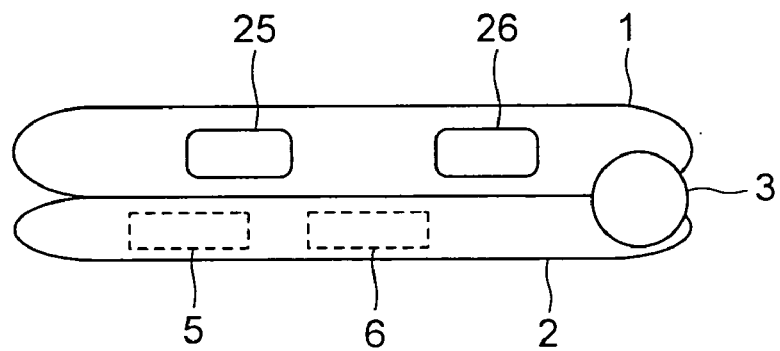
FIG. 2A is a side view showing the folded state of the foldable portable telephone according to the present invention.
Figure 2B:
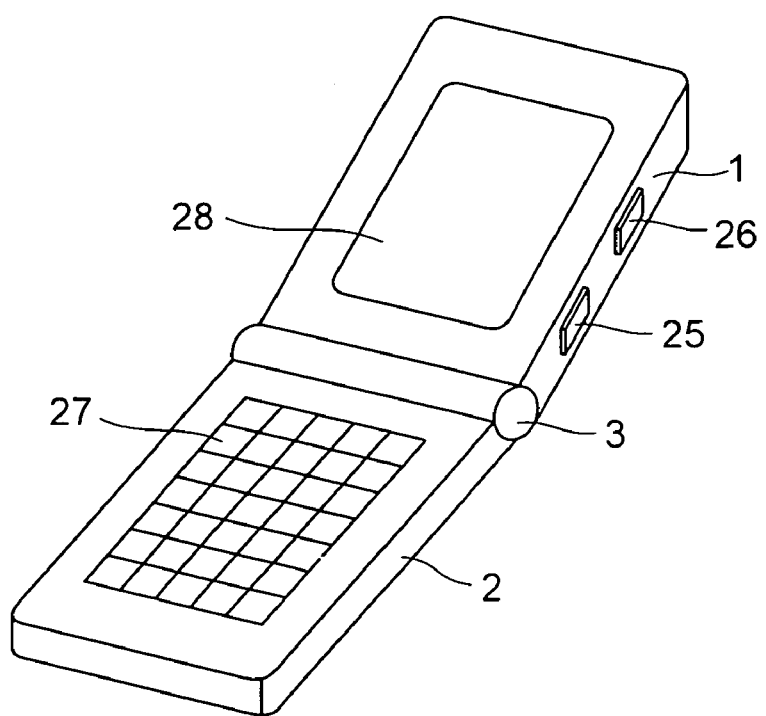
FIG. 2B is a perspective view showing the opening state of the foldable portable telephone according to the present invention.

In a foldable portable telephone according to a first embodiment of the present invention, the body of the portable telephone consists of an upper casing 1 and a lower casing 2, which are so configured as to be opened and closed with a hinge 3, as shown in FIGS. 1, 2A and 2B. FIG. 1 shows a state in which the upper casing 1 and the lower casing 2 of the body of the portable telephone are folded, viewing from the back surface side. FIG. 2A shows the folded state viewing from a side surface side of the casings.

In the lower casing 2, an operation unit 27 is arranged on a surface which comes to the inner side when folded, as shown in FIG. 2B. The operation unit 27 is to be exposed to outside when the lower casing 2 is opened. The operation unit 27 is a part where the user performs various operations of the foldable portable telephone, and includes a plurality of operation buttons. It should be noted that the operation unit 27 is simply described in the Figure. In the present invention, a part for use in operation is provided in addition to the inner side of the lower casing 2, as will be explained below. Therefore, the operation unit 27 provided on the inner side of the lower casing 2 is described as a main operation unit. The lower casing 2 also includes a memory 5 for temporarily storing data, and a control unit (CPU) 6 for controlling the whole foldable portable telephone. The memory 5 and the control unit 6 may be provided to the upper casing 1 or the hinge 3, instead of in the lower casing 2.

Figure 6:
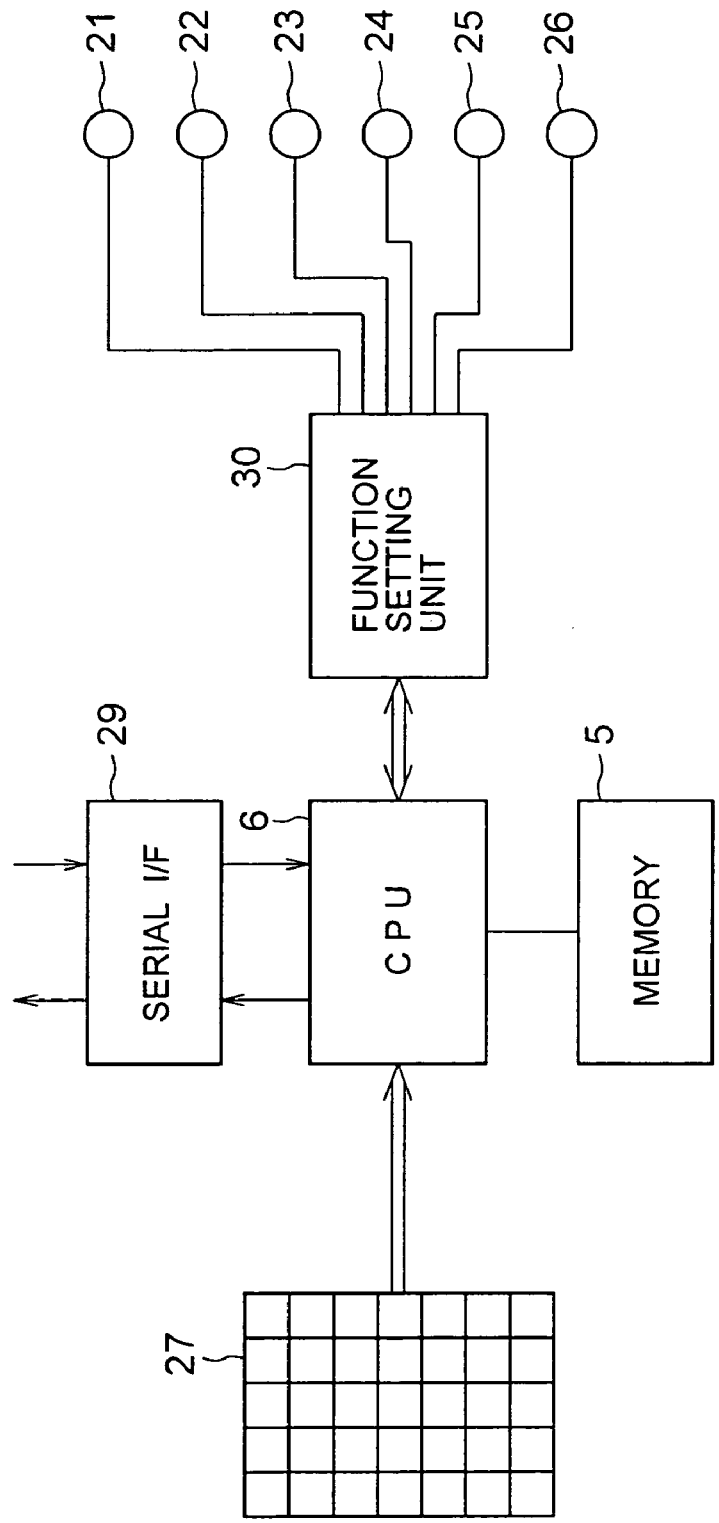
FIG. 6 is a diagram showing a mechanism for setting functions of a plurality of buttons.

As shown in FIG. 6, the control unit 6 is so configured as to read out programs stored in the memory 5, to decode instructions input from the operation unit 27, and by changing the decoded instructions into electric signals, to control functions of the portable telephone via a serial interface (serial I/F). Further, the control unit 6 decodes instructions for setting functions of buttons input from the control unit 6 and outputs the setting of the buttons to a function setting unit 30. The function setting unit 30 sets the functions of the buttons input from the operation unit 27 by assigning them to a plurality of buttons, that is, a button A 21, a button B 22, a button C 23, a button D 24, a button E 25, and a button F 26. Upon receipt of the signals input through the operations of the buttons A 21, B 22, C 23, D 24, E 25, and F 26, the function setting unit 30 analyzes the functions of the buttons, and inputs the analyzed signals to the control unit 6. The control unit 6 causes the portable telephone to execute functions based on the signals from the function setting unit 30. As for the functions of the buttons, there are set a function of sequentially scrolling data to be displayed on a back surface liquid crystal 11 which will be described below, a function of starting sending, a function of canceling an operation of the portable telephone, a function of starting a download, a function of completing or terminating a download, a function of selecting data displayed on the back surface liquid crystal 11, a function of releasing a selection of data on the back surface liquid crystal 11, a function of starting or stopping a ring tone, a function of scrolling a plurality of ring tones, and the like.

As shown in FIG. 2B, a main display 28 is arranged on a surface of the upper casing 1, which surface comes to the inner side when closed, and is to be exposed to the outside when the upper casing 1 is opened. As the main display 28, an LCD (liquid crystal display) is typically used. The upper casing 1 also includes a back surface liquid crystal 11, a button A 21, a button B 22, a button C 23, and a button D 24 on a surface which comes to the outside when closed, that is, a surface to be a back surface viewing from the main display 27. The upper casing 1 also includes a button E 25 and a button F 26 on its side surface. It should be noted that any number of buttons may be arranged on the back surface and the side surfaces of the upper casing 1. In the aforementioned embodiment of the present invention, it is assumed that four buttons are arranged on the back surface and two buttons are arranged on a side surface. The button E 25 and the button F 26 arranged on a side surface of the upper casing 1 may be arranged on a side surface of the lower casing 2, instead of on a side surface of the upper casing 1. The back surface liquid crystal 11 is an LCD (liquid crystal display), having a function as a sub-display with reference to the main display 27.

On a surface of the upper casing 1, on which the back surface liquid crystal 11 is set, there are provided two types of buttons, that is, the button A 21 and the button C 23, and the button B 22 and the button D 24, as shown in FIGS. 1, 2A and 2B. These buttons A 21 to D 24 are arranged around the back surface liquid crystal 11. Considering the operations from the human engineering aspects, the buttons A 21 and C 23, and the buttons B 22 and D 24, set at opposing positions each other over the back surface liquid crystal 11, are designed to be used in pairs, respectively. Further, as for the functions of the buttons A 21 to D 24, the pairs of the buttons A 21 and the buttons C 23, and the buttons B 22 and the buttons D 24 have the same shapes, respectively, considering the operations from the human engineering aspects. In the example shown in FIG. 1, a pair of the buttons A 21 and C 23 are formed in a circular shape, and a pair of the buttons B 22 and D 24 are formed in a narrow longitudinal shape along the longitudinal side of the back surface liquid crystal 11. Buttons E 25 and F 26, which exhibit a function of scrolling electronic data on the back surface liquid crystal 11, are arranged on a side surface of the casing 1 (or casing 2). These buttons E 25 and F 26 are formed to have the same shape. The buttons E 25 and F 26 shown in FIG. 2A are formed as rectangle.

Since the multiple buttons A 21 to D 24 are provided in concentration on the surface where the back surface liquid crystal 11 of the casings 1 and 2 are set, as aforementioned, the user can send/receive electronic data by safely holding the portable telephone with both hands. Further, by setting the shapes of a pair of the buttons as a unit, the user can easily distinguish the functions of the buttons so that maloperations can be prevented.

Moreover, the button A 21, the buttons B 22, the button C 23, the button D 24, the button E 25 and the button F 26 are assigned functions set by the user beforehand. With operations of these buttons by the user, information necessary for the user is displayed at any time on the back surface liquid crystal 11.

Next, an operation of the first embodiment will be described. FIG. 3 is a diagram showing an operational flow of the first embodiment.

The foldable portable telephone according to the embodiment of the present invention is so configured that the storing area of the memory 5 shown in FIG. 6 is divided into plural parts, in one part of which a program for controlling the operation of the control unit (CPU)6 is incorporated, and using the empty storing area, mail data is incorporated. The mail data is prepared by the user with the button operations at the operation unit 27 and saved beforehand. The present invention has a feature that the mail data stored in the memory 5 is to be sent without opening the casings 1 and 2. Further, in the memory 5, in addition to the mail data, electronic data which may often be used has been stored beforehand even in a state that the user did not store anything. The user can perform downloading of necessary data or the like using the electronic data while the casings 1 and 2 are closed. In this case, the sending address should be registered beforehand. However, if the mail sending address of the foldable portable telephone to be used is fixed as one address, it is not required to set a mail address. In a foldable portable telephone, the size of the portable telephone, when speaking, should have a size equal to a distance between an ear and the mouth of a human being, that is a size of a minimum length to make or receive phone calls. It is impossible to reduce this size. On the other hand, a function of making calls is eliminated when the telephone is folded, as the present invention. In the state of the phone being folded, the functions are limited to that of sending/receiving mails and that of accessing Web sites. Therefore, the size of a foldable portable telephone can be reduced as small as possible and with the reduced size, it is possible to secure the function of sending/receiving mails and the function of accessing Web sites. Even the size of the folded portable telephone is the minimum one, it can secure the necessary size for making/receiving phone calls when the casings 1 and 2 are opened, so that no problem arises. Further, the user sets, according to his/her individuality, the functions of the buttons A 21, B 22, C 23, D 24, E 25 and F 26 beforehand through the control unit 6 and the function setting unit 30 by operating the operation unit 27, so as to easily operate the portable telephone.

Here, assuming that electronic data is e-mail, explanations will be given for functions to be assigned to the operation buttons A 21, B 22, C 23, D 24, E 25 and F 26 when writing/reading e-mail.

(A) Function setting when writing e-mail:

Operation button A 21: delete an e-mail message displayed on the back surface liquid crystal 11, Operation button B 22: upwardly scroll an e-mail message displayed on the back surface liquid crystal 11, Operation button C 23: reply to an e-mail message displayed on the back surface liquid crystal 11, Operation button D 24: downwardly scroll an e-mail message displayed on the back surface liquid crystal 11, Operation button E 25: scroll to a latter e-mail message than one displayed on the back surface liquid crystal 11,and Operation button F 26: scroll to an older e-mail message than one displayed on the back surface liquid crystal 11.

(B) Function setting when reading e-mail:

Operation button A 21: Cancel an operation of the portable telephone,

Operation button B 22: upwardly scroll an e-mail message registered in the memory 5 and displayed on the back surface liquid crystal 11, Operation button C 23: send an e-mail message displayed on the back surface liquid crystal 11, Operation button D 24: downwardly scroll an e-mail message registered in the memory 5 and displayed on the back surface liquid crystal 11, Operation button E 25: scroll to a latter e-mail message than one displayed on the back surface liquid crystal 11, and Operation button F 26: scroll to an older e-mail message than one displayed on the back surface liquid crystal 11.

As described above relating to writing and reading of an e-mail message, functions set to the operation buttons A 21, B 22, C 23, D 24, E 25 and F 26 may be overlapped. Therefore; switching of the functions set to these operation buttons is performed by the operation unit 27. The setting of the button functions described above only shows an example, and the button functions may be set in variable ways by the user according to his/her individuality. The multiple buttons A 21, B 22, C 23, D 24, E 25 and F 26 may be preset to have functions at the time of shipment, and changed by the user according to his/her preference.

When the user writes an e-mail message, in a case that the e-mail message is a reply to a received e-mail message, an instruction to write a reply message is output to the CPU 6 by using the operation button C 23. Further, by using the operation buttons B 22 and D 24, the user writes the message while scrolling it up and down. Content of the messages written by the user are processed to be registered using the main operation unit 27 (Step A1), so as to be saved in the memory 5 as a stored content A, a stored content B, a stored content C and a stored content D(Step A2). Unnecessary e-mail messages are to be deleted using the operation button A 21. The stored content A, the stored content B, the stored content C and the stored content D are made to be contents to be sent through pushing the button A 21, the button B 22, the button C 23 and the button D 24, respectively. When the user pushes each button (Step A3), a mail message is sent (Step A4).

More specifically, in the state that the portable telephone is folded, the user operates the buttons E 25 and F 26 to thereby select an e-mail message to be sent from the messages displayed on the back surface liquid crystal 11. Then, by operating the operation buttons B 22 and D 24 so as to scroll the content of the selected e-mail message, the user checks the content of the e-mail message. After checked, the e-mail message is to be sent by operating the operation button C 23. For terminating an operation such as reading of an e-mail message or the like, the operation button A 21 is to be operated.

In a case of accessing a Web site, the operation buttons A 22 to F 26 may be assigned functions required for the access.

Figure 4A:
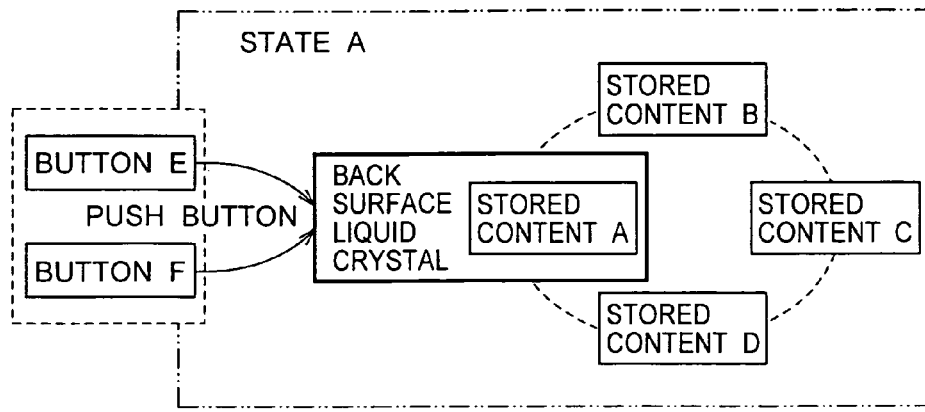
FIGS. 4A, 4B and 4C are diagrams showing changes of contents displayed on the back surface liquid crystal.
Figure 4B:
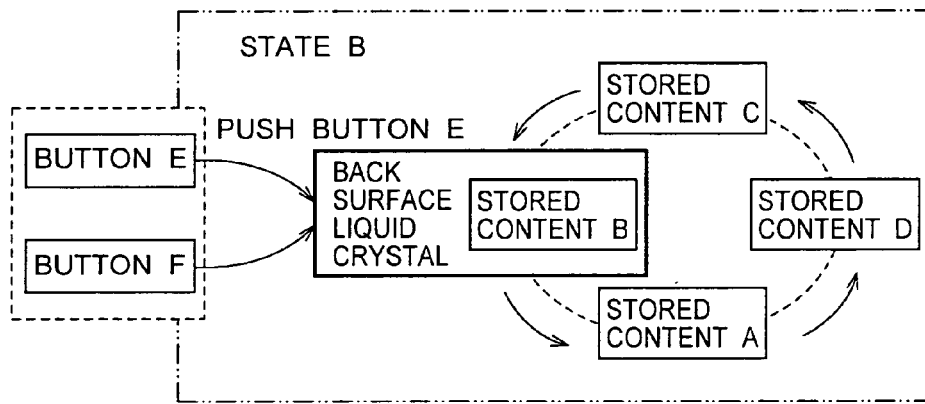
Figure 4C:
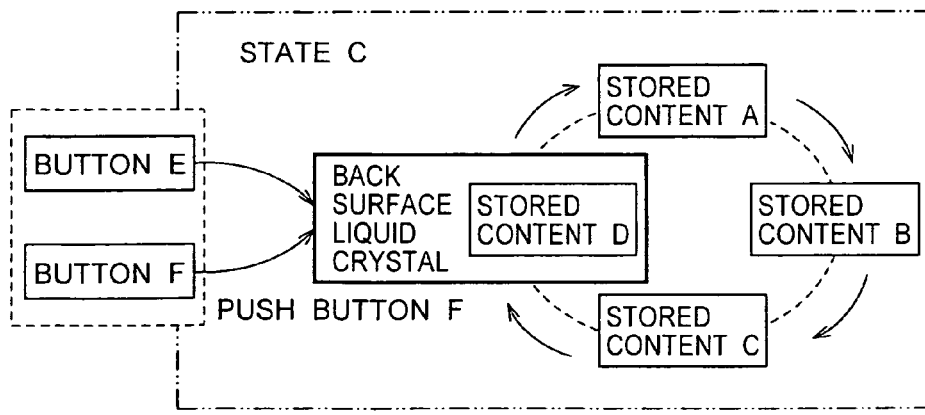

As described above, the button E 25 and the button F 25 are assigned functions of selection and releasing data on the back surface liquid crystal 11. This will be explained below in detail. FIGS. 4A, 4B and 4C are diagrams showing the changes of the content displayed on the back surface liquid crystal 11. In the initial state, the stored content A is displayed on the back surface liquid crystal 11 as State a (FIG. 4A). When the button E 25 is pushed, the content displayed on the back surface liquid crystal 11 is changed to the stored content B as State b (FIG. 4B). Similarly, when the button F 26 is pushed, the content displayed on the back surface liquid crystal 11 is changed to the stored content D as State c (FIG. 4C). In this way, the user can select an e-mail message to be sent through checking the contents of the mail messages saved by himself/herself.

Besides the aforementioned method, it is possible to operate with less number of buttons by switching e-mail messages displayed on the back surface liquid crystal 11 with the button E 25 or the button F 26, and sending the displayed e-mail message with another button.

By applying this mail sending function, if an e-mail message is written and saved beforehand in a place outside the service area or a situation where the signal condition is bad, the message can be easily sent when comes to a place inside the service area by operating buttons without opening the folded portable telephone.

It should be noted that although in the first embodiment an example is shown in which the back surface liquid crystal 11 serving as a sub-display is arranged on the back surface of the main display 28 of the upper casing 1, the position of the sub-display is not limited to this position. The sub-display may be arranged at any position which is viewable in the folded state. In other words, the sub-display may be arranged on the back surface of the main operation unit of the lower casing 2, on a side surface of the upper casing 1 or the lower casing 2, or on a remote controller. Similarly, the button A 21, the button B 22 and the like may be arranged at any position which is operable in the folded state. For example, they may be provided on a remote controller of the portable telephone.

Next, a second embodiment of the present invention will be explained. The structure of the second embodiment is the same as that of the first embodiment described in FIG. 1. FIG. 5 is a diagram showing an operational flow of the second embodiment.

This structure enables the button A 21, the button B 22, the button C 23 and the button D 24 to be assigned various functions such as playing of a ring tone and displaying of a schedule, at the user's discretion.

The user operates the main operation unit 27 (Step B1) to thereby assign a function A, a function B, a function C 23 and a function D 24 to the button A 21, the button B 22, the button C 23 and the button D 24, respectively (Step B2). When the button A 21, the button B 22, the button C or the button D is pushed (Step B3), the function assigned to each button is executed (Step B4).

Although a portable telephone rings a ring tone when receives e-mail, there is a request to listen to ring tones irrespective of receiving e-mail. In this case, the functions of the operation buttons A 21 to F 26 are set as follows:

Operation button A 21: stop playing a ring tone,

Operation button C 23: start playing a ring tone,

Operation button E 25: scroll to a ring tone next to the currently selected ring tone, Operation button F 26: scroll to a ring tone prior to the currently selected ring tone.

For example, in a case that a function of playing a ring tone is assigned to the button A 21, the function A is set to be a function of playing a ring tone. When the button A 21 is pushed, the ring tone is rang. Further, by assigning functions of scrolling ring tones to be rang to the button E 25 and the button F 26, the ringing tone is changed to another one, so that another registered ring tone can be listened.

The second embodiment has, if combined with the first embodiment, both effects. When combined, the switching setting between the functions of the first embodiment and that of the second embodiment can be performed by operating the main operation unit 27. If the switching setting is performed with a button provided on the back surface of the upper casing 1, or on a side surface of the upper casing 1 or a lower casing 2, the switching can be achieved without opening the foldable portable telephone. Therefore, the portable telephone can be used with further conveniences.

(Effects)

As described above, the present invention has an effect to improve operability in that the number of open-close operations by the user of the foldable portable telephone is reduced.

Further, it also has an effect to improve operability in that one operation can be done with one button operation without opening the foldable portable telephone.

What is claimed is:

1. A foldable portable telephone comprising:
    a body of the portable telephone which is foldably formed;
    a main operation unit for causing a function of the body of the portable telephone to be executed;
    a main display for displaying electronic data retained in the portable telephone;
    a sub-display arranged at a viewable position in a folded state; and communication controlling means for sending email, positioned for operation when the telephone is in a folded state; wherein
    the main operation unit and the main display are arranged at positions on inner sides of the body of the portable telephone when folded,
    the sub-display displays the electronic data retained in the portable telephone, wherein email can be sent when the telephone is in a folded state by operating the communication controlling means.

2. The foldable portable telephone, as claimed in claim 1, wherein the communication controlling means includes a plurality of operation buttons.

3. The foldable portable telephone, as claimed in claim 2, wherein the plurality of operation buttons are arranged around the sub-display.

4. The foldable portable telephone, as claimed in claim 2, wherein the plurality of operation buttons are arranged around the sub-display and on a side surface of the body of the portable telephone.

5. The foldable portable telephone, as claimed in claim 1, wherein the sub-display is arranged at a part which comes to an outer side in the folded state.

6. The foldable portable telephone, as claimed in claim 1, wherein further communication controlling means are positioned for operation when the telephone is in a folded state; wherein the further communication controlling means are provided for the operations related to telephone functions and manipulation of electronic data.

7. The foldable portable telephone, as claimed in claim 1, wherein is to be operated in a state that the body of the portable telephone is folded, and performs controlling for displaying on the sub-display the electronic data retained in the portable telephone and controlling of communications of the electronic data displayed on the sub-display.

8. The foldable portable telephone, as claimed in claim 6, wherein the communication controlling means includes a plurality of operation buttons, and, wherein the shapes of the operation buttons differ according to functions thereof.

9. The foldable portable telephone, as claimed in claim 6, wherein the electronic data may be data to be downloaded from a Web site, or data to be uploaded to a Web site.

10. The foldable portable telephone, as claimed in claim 8, wherein the operation buttons are assigned a function of selecting electronic mail data as well as a function other than the function of selecting electronic mail data.

11. The foldable portable telephone, as claimed in claim 8, wherein the operation buttons are assigned a function of playing a ring tone as well as a function of selecting electronic data.

12. The foldable portable telephone, as claimed in claim 8, wherein the operation buttons are assigned a function of displaying a schedule on the sub-display as well as a function of selecting electronic data.

13. The foldable portable telephone, as claimed in claim 8, wherein the operation buttons are assigned a function of displaying a piece of electronic mail data selected from a plurality of pieces of electronic mail data on the sub-display.

14. The foldable portable telephone, as claimed in claim 8, wherein the operation buttons are assigned a function of registering electronic mail data.

15. The foldable portable telephone, as claimed in claim 8, wherein the operation buttons are assigned a function of selecting electronic mail data or a function of sending electronic mail data as well as a function other than the function of selecting a mail message and the function of sending electronic mail data.

16. The foldable portable telephone, as claimed in claim 8, wherein the operation buttons are assigned a function of playing a ring tone as well as a function of selecting electronic mail data or a function of sending electronic mail data.

17. The foldable portable telephone, as claimed in claim 8, wherein the operation buttons are assigned a function of displaying a schedule to the sub-display as well as a function of selecting electronic mail data or a function of sending electronic mail data.

* * * * *